United States Patent
Larson et al.

(10) Patent No.: US 8,677,936 B2
(45) Date of Patent: Mar. 25, 2014

(54) BREAKAWAY ARM FOR A ROTARY MILKER UNIT DETACHER

(75) Inventors: Larry G. Larson, Holmen, WI (US); Patrick M. Hein, Viroqua, WI (US); Glenn A. Klomsten, Trempealeau, WI (US)

(73) Assignee: GEA Farm Technologies, Inc., Naperville, IL (US)

( * ) Notice: Subject to any disclaimer, the term of this patent is extended or adjusted under 35 U.S.C. 154(b) by 106 days.

(21) Appl. No.: 12/655,966

(22) Filed: Jan. 11, 2010

(65) Prior Publication Data
US 2011/0168095 A1    Jul. 14, 2011

(51) Int. Cl.
*A01J 5/00*    (2006.01)

(52) U.S. Cl.
USPC ........................................................ 119/14.1

(58) Field of Classification Search
USPC ............ 119/14.01, 14.1, 14.18, 14.02, 14.13, 119/14.24, 14.45, 14.51; 901/27, 28; 285/1, 285/2, 116, 304; 446/4, 331; 254/4 R
See application file for complete search history.

(56) References Cited

U.S. PATENT DOCUMENTS

| | | | | |
|---|---|---|---|---|
| 498,947 A * | 6/1893 | Atwater | ....................... | 119/14.1 |
| 827,311 A * | 7/1906 | Hutchinson | ................... | 119/14.1 |
| 1,412,092 A * | 4/1922 | Rosenfield | ................. | 119/14.24 |
| 2,366,273 A * | 1/1945 | Lowry | ........................ | 119/14.11 |
| 2,453,646 A * | 11/1948 | Tomlin et al. | ................. | 446/331 |
| 2,463,355 A * | 3/1949 | Buchmann | ..................... | 446/331 |
| 2,488,754 A * | 11/1949 | Willson | ...................... | 340/309.7 |
| 3,358,401 A * | 12/1967 | Graf | ............................... | 446/331 |
| 3,730,544 A * | 5/1973 | Hyman | ......................... | 280/819 |
| 3,738,321 A * | 6/1973 | Hicks | .......................... | 119/14.45 |
| 3,938,470 A * | 2/1976 | Pace | .............................. | 119/14.1 |
| 4,056,077 A | 11/1977 | Schluckbier | | |
| RE29,848 E | 11/1978 | Schluckbier | | |
| 4,488,373 A * | 12/1984 | Glickson et al. | ................... | 446/4 |
| 5,183,427 A * | 2/1993 | Draper | .............................. | 446/4 |
| 5,379,721 A * | 1/1995 | Dessing et al. | ............. | 119/14.08 |
| 5,379,722 A * | 1/1995 | Larson | .......................... | 119/14.1 |
| 6,082,767 A * | 7/2000 | Bujold et al. | ................. | 280/819 |
| 6,357,387 B1 * | 3/2002 | Johannesson | .............. | 119/14.47 |
| 6,814,027 B2 * | 11/2004 | Hein et al. | ................. | 119/14.04 |
| 6,990,923 B2 | 1/2006 | Hein et al. | | |

FOREIGN PATENT DOCUMENTS

WO    WO01/20975 A2    3/2001
WO    WO2009/151631    12/2009

OTHER PUBLICATIONS

International Search Report dated Jun. 29, 2011 from PCT/US2011/000038 (Int'l Filing Date: Jan. 11, 2010).

* cited by examiner

*Primary Examiner* — Rob Swiatek
*Assistant Examiner* — Ebony Evans
(74) *Attorney, Agent, or Firm* — Smith Law Office

(57) ABSTRACT

A dairy milker unit detacher having a milker unit support arm that resists damage and breakage by incorporating a breakaway mechanism that disengages and then automatically or easily returns the support arm to a functional arrangement when a dairy animal or other force engages the support arm.

10 Claims, 6 Drawing Sheets

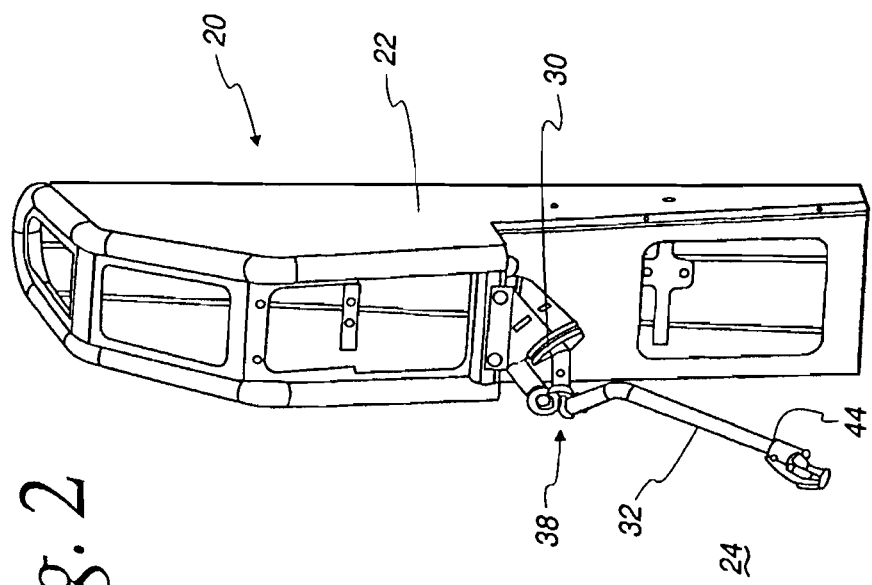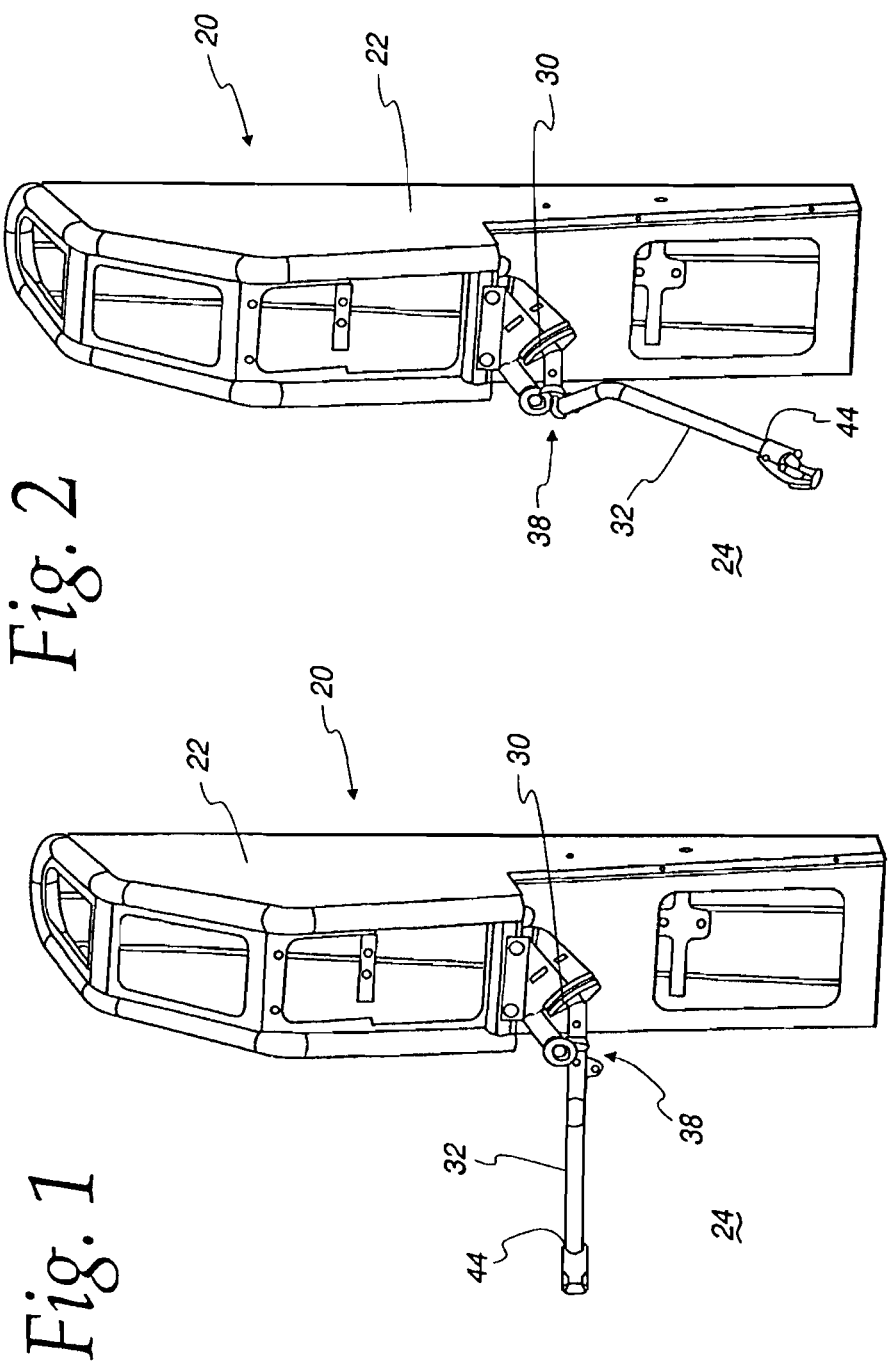

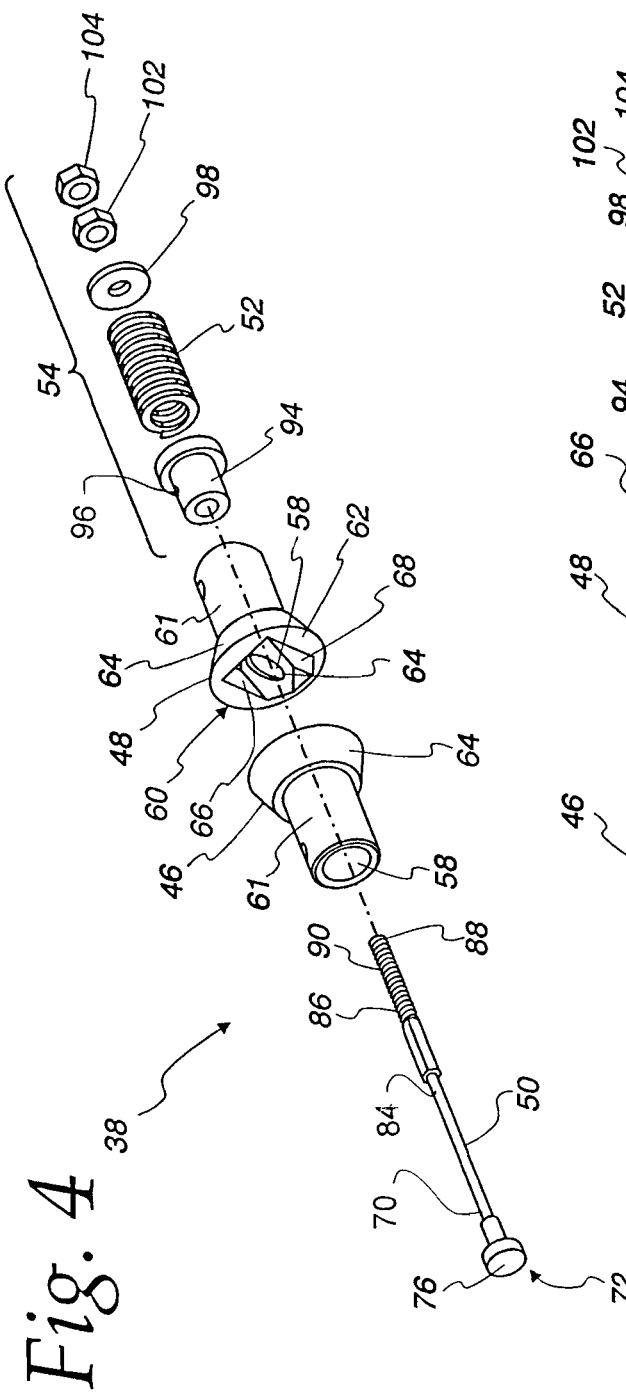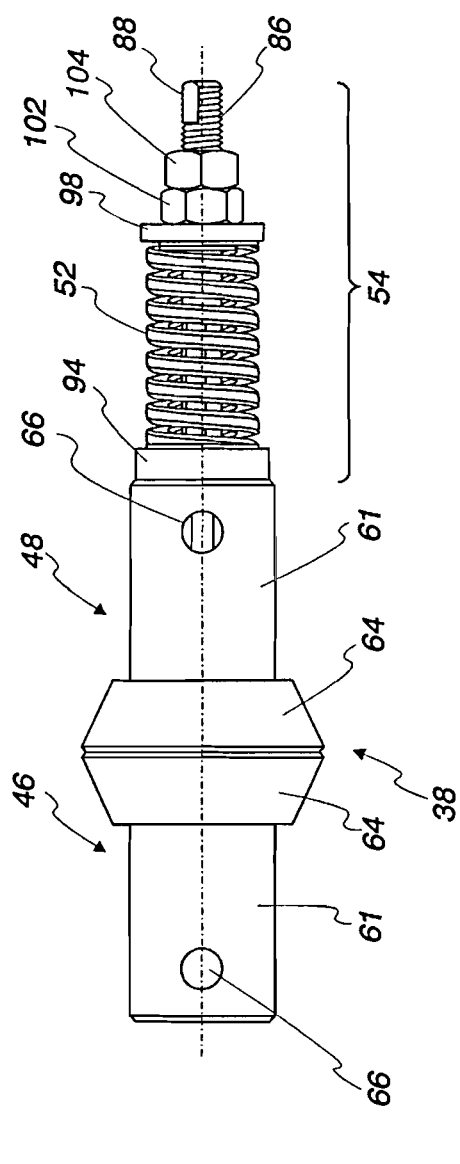

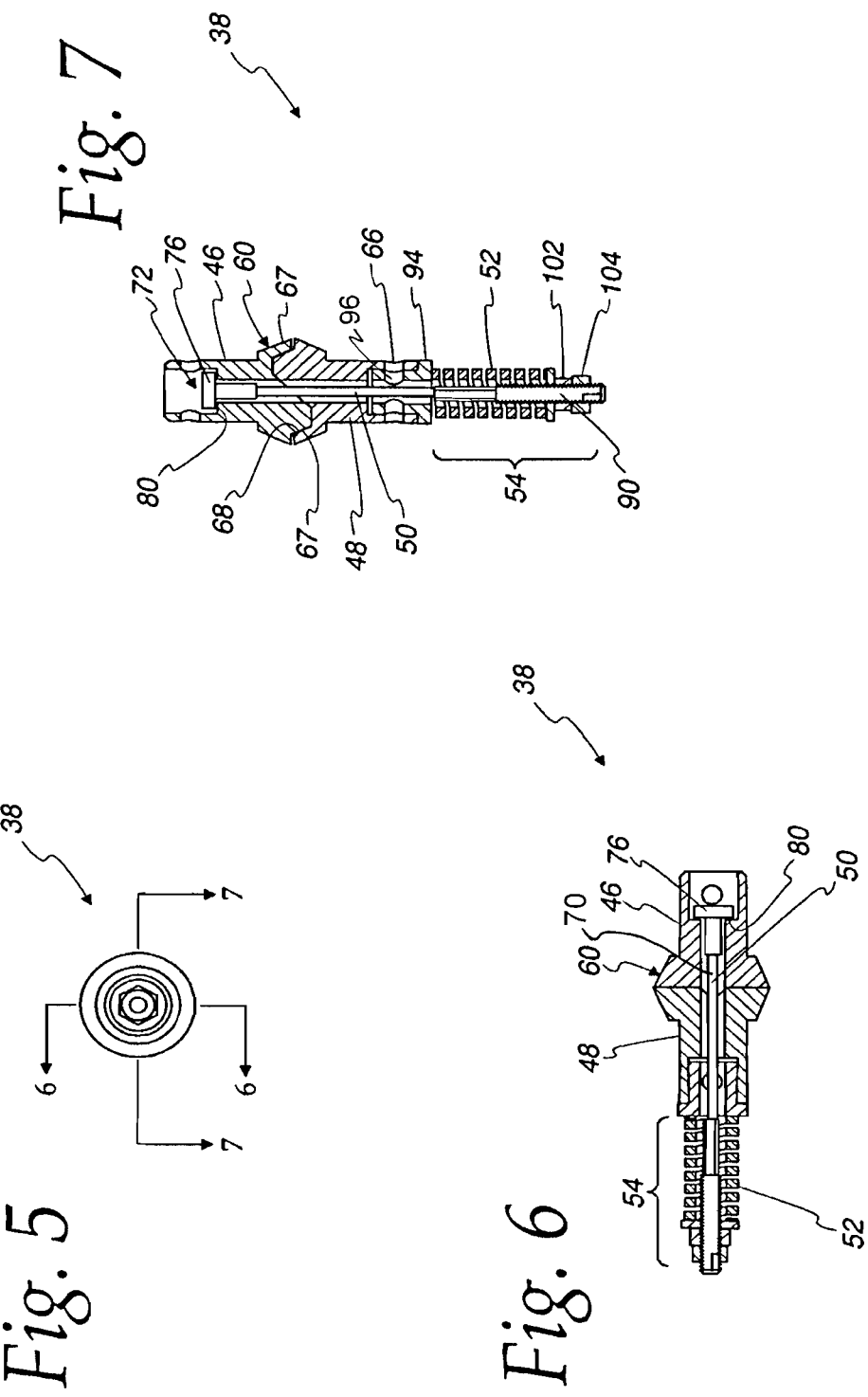

BREAKAWAY ARM FOR A ROTARY MILKER UNIT DETACHER

FIELD AND BACKGROUND OF THE INVENTION

The present invention relates to milker unit detachers for use in dairy harvesting facilities, and in particular to a milker unit support arm device that resists accidental damage from dairy animals.

In dairy harvesting facilities, milker units are attached to dairy animals to automatically milk the animals. Milk is collected in the milker units and fed through milk tubes that are connected to a central dairy pipeline system. At the end of a milking operation on each animal, the milker units are detached and moved away from the dairy animal using a milker unit detacher.

In some dairy harvesting facilities such as rotary milking parlors, milking stalls are confined spaces that require the milker unit to be withdrawn from under an animal and moved to a storage position that enables animals to enter and egress its milking stall without damaging the milker units and the milker unit detachers. To do this, the milker unit is supported by a movable detacher support arm that swings and/or pivots from a milking position to a storage position.

Despite operation and movement of the support arm, dairy animals often come into contact with the support arm during entry to and egress from the milking stall, and during a milking operation. Such contact can damage the milker unit support arm, interfere with dairy operations, and require time consuming and expensive maintenance.

To minimize damage to milker unit detachers, spring-loaded assemblies have been used to accommodate a limited amount of impact or force from dairy animals. Known spring loaded detachers accommodate movement in one direction. While useful, these prior spring assemblies did not accommodate support arm movement in all directions, and were relatively difficult to reset.

Thus, there is needed a milker unit detacher with a support arm that supports and moves a milker unit from a milking position to a storage position and is resistant to damage from dairy animals.

SUMMARY OF THE INVENTION

The present invention is directed to a milker unit detacher arm that supports a milker unit when in a milking position, when moving between a milking position and a storage position, and is resistant to damage from contact by dairy animals or other forces.

A dairy milker unit support arm in accordance with the present invention includes a controlled breakaway assembly that enables a support arm tube or bar to flex in all directions when engaged by a dairy animal and then be automatically or easily returned to a standard support position.

The support arm can include first arm segment with a bearing surface formed or attached to its proximate end that bears on a bearing surface of a second arm segment. A tension element such as a spring can be used to hold the support arm in place until a predetermined load to the support arm is exceeded. When such a load is applied, the tension element is further tensioned and the bearing surface can become disengaged to harmlessly absorb the dairy animals force. This action prevents the support arm from being bent or broke, and yet when the load is removed, the support arm bearing surfaces can be repositioned with the aid of the tension member and the undamaged support arm is ready for another use.

The tension member can be adjustable so that the tension is set to keep the support arm supportive during milking and detaching operations, but low enough to protect the support arm from substantial damage when engaged by a dairy animal or any other force, such as operators, cleaning equipment or any other person or device in the dairy facility. The tension member can be a spring, resilient member, or any element that can be tensioned to hold the first and second arm segments in bearing to contact during normal use.

The support arm can be substantially horizontal in the milking position and substantially vertical in a storage position. These orientations are typical in rotary milking parlors, for example. It may be desirable to use the support arm to support other milking components, such as hoses for milk and pulsation, and to properly align a milking unit under or near an animal during attachment of the milker unit and the milking operation.

BRIEF DESCRIPTION OF THE DRAWINGS

FIG. 1 is a front perspective view of a milker unit detacher with a support arm in accordance with the present invention, in a milking position;

FIG. 2 is a front perspective view of a milker unit detacher with the support arm in a breakaway position;

FIG. 3 is a side view of a breakaway device for a milker unit support arm in accordance with the present invention;

FIG. 4 is an exploded perspective view of a breakaway device for a milker unit support arm in accordance with the present invention;

FIG. 5 is an end view of the breakaway device for a milker unit support arm in accordance with the present invention;

FIG. 6 is a cross-section of the breakaway device for a milker unit support arm taken along line 6-6 of FIG. 5;

FIG. 7 is a cross-section of the breakaway device for a milker unit support arm taken along line 7-7 of FIG. 5;

DETAILED DESCRIPTION OF THE INVENTION

Figure 10:
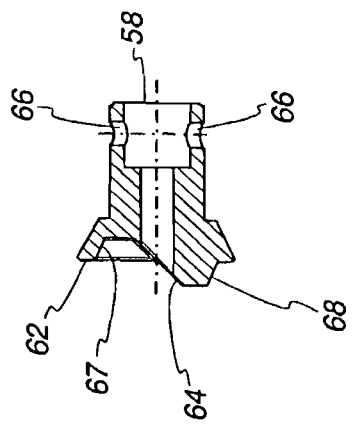
FIG. 10 is a cross-section of the bearing surface taken along line 10-10 of FIG. 9.

In the following detailed description of the drawings, the same reference numeral will be used to designate the same or similar elements in each of the figures.

FIG. 1 illustrates a milker unit detacher 20 joined to a cabinet 22 that preferably forms part of a milking stall in a dairy harvesting facility. The cabinet 22 can be any appropriate size, shape or construction to accommodate a milker unit detacher operating mechanism, such as disclosed in U.S. Pat. Nos. 6,814,027 and 6,990,923, and PCT/US09/03536, incorporated herein by reference. The cabinet 22 can be an enclosed cabinet, as illustrated, or it can be an open cabinet or have an open frame construction.

The operating mechanism can be any suitable mechanism and preferably includes a pivoting hub 30 joined to the cabinet 22 and to a support arm 32. The hub 30 preferably pivots about an axis to move the support arm 32 between a milking position (as illustrated in FIG. 1) to a storage position. Preferably, the milking position is a substantially horizontal orientation of the milker unit support arm 32 and the storage position is a substantially vertical orientation, but other orientations are possible and within the scope of the present invention.

As illustrated in FIG. 1, the milking position of the milker unit support arm 32 blocks an open portion of the milking stall 24 through which a dairy animal enters and egresses. In this position, the support arm 32 is vulnerable to bending and breaking if a dairy animal moves during milking or moves too quickly when exiting the milking stall 24.

Dairy animals can be unpredictable and move suddenly in any direction. Thus, the support arm 32 must absorb a force applied by the dairy animal from any direction. To reduce or prevent damage to the support arm 32, more robust components can be used. Nonetheless, the size and weight of a dairy animal can damage even robust milker detacher components. The present invention includes a breakaway assembly 38 that reduces support arm damage.

Figure 9:
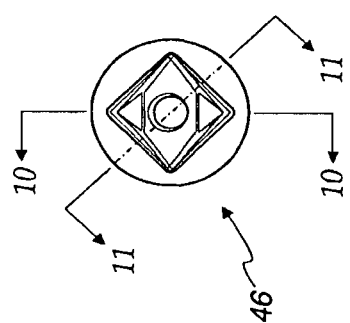
FIG. 9 is an end view of the bearing surface of FIG. 8.
Figure 12:
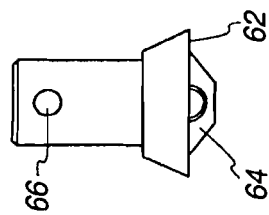
FIG. 12 is a side view of the bearing surface of FIG. 8.
Figure 8:
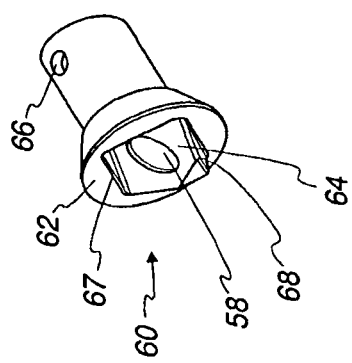
FIG. 8 is a perspective view of a bearing surface of the present invention.
Figure 11:
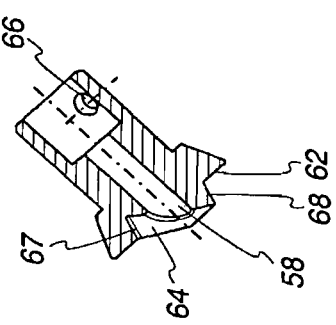
FIG. 11 is a cross-section of the bearing surface taken along line 11-11 of FIG. 9.
Figure 13:
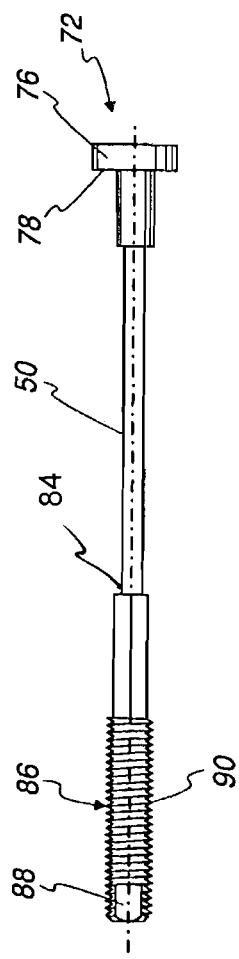
FIG. 13 is a breakaway cable in accordance with the present invention.
Figure 14:
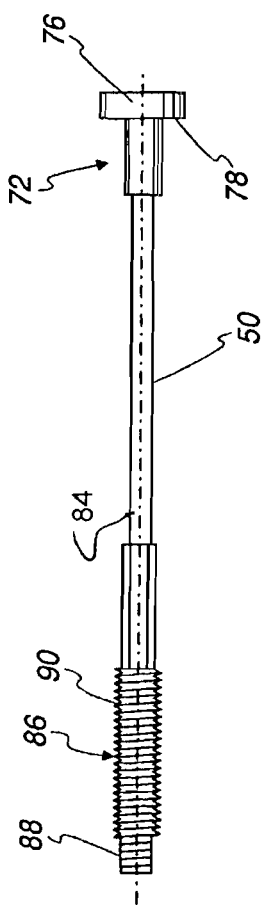
FIG. 14 is a partial cross-section of the cable of FIG. 13.
Figure 15:
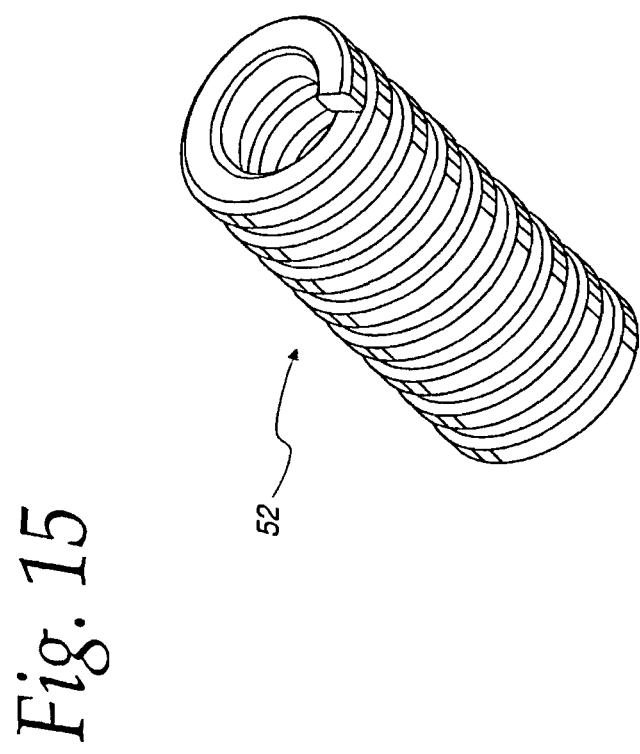
FIG. 15 is a perspective view of a tensioning member in accordance with the present invention.

The breakaway assembly 38 is preferably joined to or is integral with the milker unit detacher support arm 32 at a location closer to the cabinet 26 than a distal end 44 of the detacher arm 32. As best seen in FIGS. 3 through 15, the breakaway assembly 38 preferably includes a first arm segment 46, a second arm segment 48, a cable 50, and a tensioning mechanism 54. The first arm segment 46 and the second arm segment 48 can be integral with or attached to portions of the support arm 32 or they can be installed at the proximate end of the support arm 32. In the illustrated example, the first arm segment 46 is joined to a support arm 32 using any suitable type of connector or connection including screws, bolts, welding, swaging and others. As described below, the first arm segment 46 is closer to the cabinet 22 than the second arm segment 48, but they could be reversed, as well.

Preferably, the first arm segment 46 and the second arm segment 48 are identical in shape and construction, but this is not absolutely necessary within the scope of the invention. Each arm segment 46, 48 preferably defines a chamber 58 through which the cable 50 extends. Each arm segment 46, 48 also includes a bearing surface 60.

In addition, each arm segment 46, 48 preferably includes a tubular portion 61 and an enlarged portion 64. The tubular portion 61 can include a clearance hole 66 through which a connector can join the tubular portion 61 to the tensioning mechanism 54. The enlarged portion 64 is tapered to act as a ramp to aid in returning the breakaway assembly 38 to its normal position.

The bearing surface 60 on each arm segment 46, 48 can be flat, concave, convex or any other suitable shape or size. In a preferred embodiment, the bearing surface 60 includes a peripheral flat surface 62 that is transverse or about 90° relative to a longitudinal axis of the arm segment 46, 48. Interior to the flat surface 62 is a ramped surface 64 disposed at about 45° relative to a longitudinal axis of the arm segment 46, 48. The ramped bearing surface 64 extends longitudinally outwardly and inwardly from the flat surface 62, and has an interior shoulder 66 and an exterior shoulder 68 disposed at about 15° relative to the longitudinal axis of the arm segment 46, 48. The interior shoulder 66 on one arm segment engages the exterior shoulder 68 on a mating arm segment. Preferably, the first and second arm segments 46, 48 are made of nylon 6, black, but other materials can be used as well.

The first arm segment 46 fits against the second arm segment 48 in a releasable arrangement. Tension on the cable 50 (as described below) holds the first arm segment 46 and the second arm segment 48 together under most circumstances. Nonetheless, the cable 50 is flexible enough that a force from a dairy animal, for example, can cause the first arm segment 46 and the second arm segment to disengage as depicted in FIG. 2. The tension in the cable 50 automatically reassembles the first and second arm segments 46, 48 or, at worst, an operator may have to assist in bringing the two parts back together. The cable 50 can be any flexible element, but is preferably a 7×19 cable that is made of stainless steel.

To apply and maintain tension in the breakaway assembly 38, the cable 50 and the tensioning mechanism 54 interact to set a desired tension. In the illustrated embodiment, the cable 50 includes a first end portion 70 having to set a desired tension a first bearing member 72 attached thereto using any suitable means, including swaging. The first bearing member 72 has a broadened portion 76 to define a shoulder 78 that bears on an internal shoulder 80 of the first arm segment 46. (See FIGS. 6 and 7).

The cable 50 also preferably includes a second end portion 84 onto which a stud 86 is joined by any suitable means including swaging. The stud 86 can include wrench flats 88 for turning or holding with a wrench or preferably a slot, through which a screw driver or other device is inserted for holding the piece securely, and threads 90 that are used to connect and adjust the cable 50 to the tensioning mechanism 54. The tensioning mechanism 54 could be at either end of the breakaway assembly 38, but for space considerations, it is preferred to be joined to the second arm segment 48 or at least at the distal end of the breakaway assembly 38.

In the illustrated embodiment, the second end portion 84 of the cable 50 extends through a tensioning element 52, and is joined to the tensioning mechanism 54. The tensioning element 52 is preferably a compression spring, but it can be a resilient member or component that tensions the cable 50. Also preferably, the tensioning member 52 is a Danly Diemax XL Spring, Part #9-1206-36, Sprg.0.750X1.50-Yellow-X-Heavy Rectangular Wire, Hole Diameter: ¾ in. (20 mm), Free Length: 1.50 in (38 mm), Spring Constant: 111.00 lbs/ 0.10 in (194.0N/mm) available from distributors throughout the United States, including Airgas, 1007 Monitor Street, P.O. Box 3119, La Crosse, Wis. 54601.

The tensioning mechanism 54 further includes a second bearing member 94, a washer 98, a first nut 102, and a second nut 104. Tightening the first nut 102 applies a force to the washer 98 to compress the tensioning element 52. This pretensions the cable 50 and applies a bearing force that maintains the bearing surfaces 60 of each arm segment 46, 48 in bearing contact. The second nut 104 is a jam nut that maintains the desired position of the first nut 102, and preferably the threads 90 and/or the threads of the nuts 102, 104 are treated to prevent the threads from locking ("freezing").

The second bearing element 94 transfers force from the tensioning element 52 to the second arm segment 48, as illustrated. The second bearing element 94 preferably includes a connector hole 96 that aligns with the alignment hole 66 on the second arm segment 48.

In use, the support arm 32 operates as any other milker unit support arm. The combination of size of the bearing surfaces 60 and tension in the cable 50 maintains the first arm segment 46 in a coaxial arrangement with the second arm segment 48 until the applied force exceeds a predetermined force, the cable 50 bends, the tensioning element 52 may compress slightly, and the first arm segment 46 and the second arm segment 48 buckle about their respective bearing surfaces 60 to the position illustrated in FIG. 2. When the force is removed, the spring 52 expands to tension the cable 50 and realign the first arm segment 46 and the second arm segment 48, either automatically with no assistance from an operator, or easily with some assistance by an operator.

The foregoing detailed description of the invention is for clearness of understanding only and no unnecessary limitations therefrom should be read into the following claims.

The invention claimed is:

1. A breakaway assembly in combination with a milker unit detacher support arm, the breakaway assembly comprising:
   a detacher first arm segment having a connection point for being joined to a milker unit detacher, and having a first bearing surface;
   a detacher second arm segment having a second bearing surface releasably engaged with the first bearing surface when the breakaway assembly is in an engaged configuration, and having an end portion for supporting a milker unit;
   a cable joined to the detacher first arm segment and the detacher second arm segment to join the detacher first arm segment to the detacher second arm segment when the breakaway assembly is in a disengaged configuration; and
   a tensioning mechanism joined to the cable to tension the cable to at least partially maintain the detacher first arm segment first bearing surface and the detacher second arm segment second bearing surface in the engaged position, and to at least partially realign the detacher first arm segment and the detacher second arm segment from the disengaged position to the engaged position.

2. The breakaway assembly of claim 1, wherein the first bearing surface is disposed at an angle to a longitudinal axis of the detacher first arm segment.

3. The breakaway assembly of claim 1, wherein the cable extends through a bore defined by the detacher first arm segment and a bore defined by the detacher second arm segment.

4. The breakaway assembly of claim 1, wherein the cable extends through at least a portion of the tensioning mechanism.

5. The breakaway assembly of claim 1, tensioning mechanism comprises:
   a tensioning element.

6. The breakaway assembly of claim 5, wherein the cable comprises:
   a threaded portion, and the tensioning mechanism comprises:
   a nut threaded on the threaded portion of the cable threaded portion.

7. The breakaway assembly of claim 1, wherein the cable engages the detacher first arm segment with a bearing element joined to the cable.

8. The breakaway assembly of claim 1, wherein the first bearing surface and the second bearing surface each have the same shape.

9. The breakaway assembly of claim 1, and wherein the tensioning mechanism comprises:
   a tensioning element; and
   a bearing plate disposed between the tensioning element and the detacher second arm segment.

10. The breakaway assembly of claim 1, wherein the tensioning mechanism comprises:
    a tensioning element, and the tensioning element comprises a spring.

* * * * *